(12) United States Patent
Sadowski et al.

(10) Patent No.: US 10,748,099 B1
(45) Date of Patent: Aug. 18, 2020

(54) FOUNDATIONAL ANALYTICS ENABLING DIGITAL TRANSFORMATIONS

(71) Applicant: Sykes Enterprises, Incorporated, Tampa, FL (US)

(72) Inventors: Richard Sadowski, Tampa, FL (US); J. Shelton Hook, Jr., Tampa, FL (US); David Pearson, Tampa, FL (US); Stephen Berdy, Tampa, FL (US)

(73) Assignee: Sykes Enterprises, Incorporated, Tampa, FL (US)

( * ) Notice: Subject to any disclaimer, the term of this patent is extended or adjusted under 35 U.S.C. 154(b) by 184 days.

(21) Appl. No.: 16/170,504

(22) Filed: Oct. 25, 2018

Related U.S. Application Data

(63) Continuation-in-part of application No. 15/402,210, filed on Jan. 9, 2017.

(60) Provisional application No. 62/276,179, filed on Jan. 7, 2016.

(51) Int. Cl.
*G06F 16/17* (2019.01)
*G06Q 10/06* (2012.01)
*H04L 12/26* (2006.01)
*G06N 20/00* (2019.01)

(52) U.S. Cl.
CPC ........ *G06Q 10/0633* (2013.01); *G06F 16/17* (2019.01); *G06N 20/00* (2019.01); *G06Q 10/0639* (2013.01); *H04L 43/04* (2013.01)

(58) Field of Classification Search
CPC ...................................................... G06F 16/17
USPC ........................................................ 707/609
See application file for complete search history.

(56) References Cited

U.S. PATENT DOCUMENTS

| | | | |
|---|---|---|---|
| 2013/0103656 A1* | 4/2013 | Sanchez Loureda | ... G06F 16/17 707/693 |
| 2016/0357587 A1* | 12/2016 | Yadav | ................ H04L 47/2441 |
| 2018/0157851 A1* | 6/2018 | Sgambati | ................ G06F 21/44 |

* cited by examiner

*Primary Examiner* — Joshua Bullock
(74) *Attorney, Agent, or Firm* — Shumaker, Loop & Kendrick, LLP; Jeffrey B. Fabian

(57) ABSTRACT

Disclosed are systems and methods that enable both the real-time monitoring and historical tracking of events and actions performed by disparate systems and software applications associated with a computing device that also permit insight into the relationships between such events and actions. The inventive systems and methods synchronously and asynchronously capture event data from various event sources associated with a computing device. The event data can be enriched before correlating associated event data into transactions resulting in telemetry information to provide a more accurate and complete picture of what activities the computing device is performing and how the computing device is utilized to accomplish particular tasks. This telemetry information enables the system to perform descriptive and predictive analytical processes as well as artificial intelligence that provide valuable insights to improve end user and system performance.

17 Claims, 5 Drawing Sheets

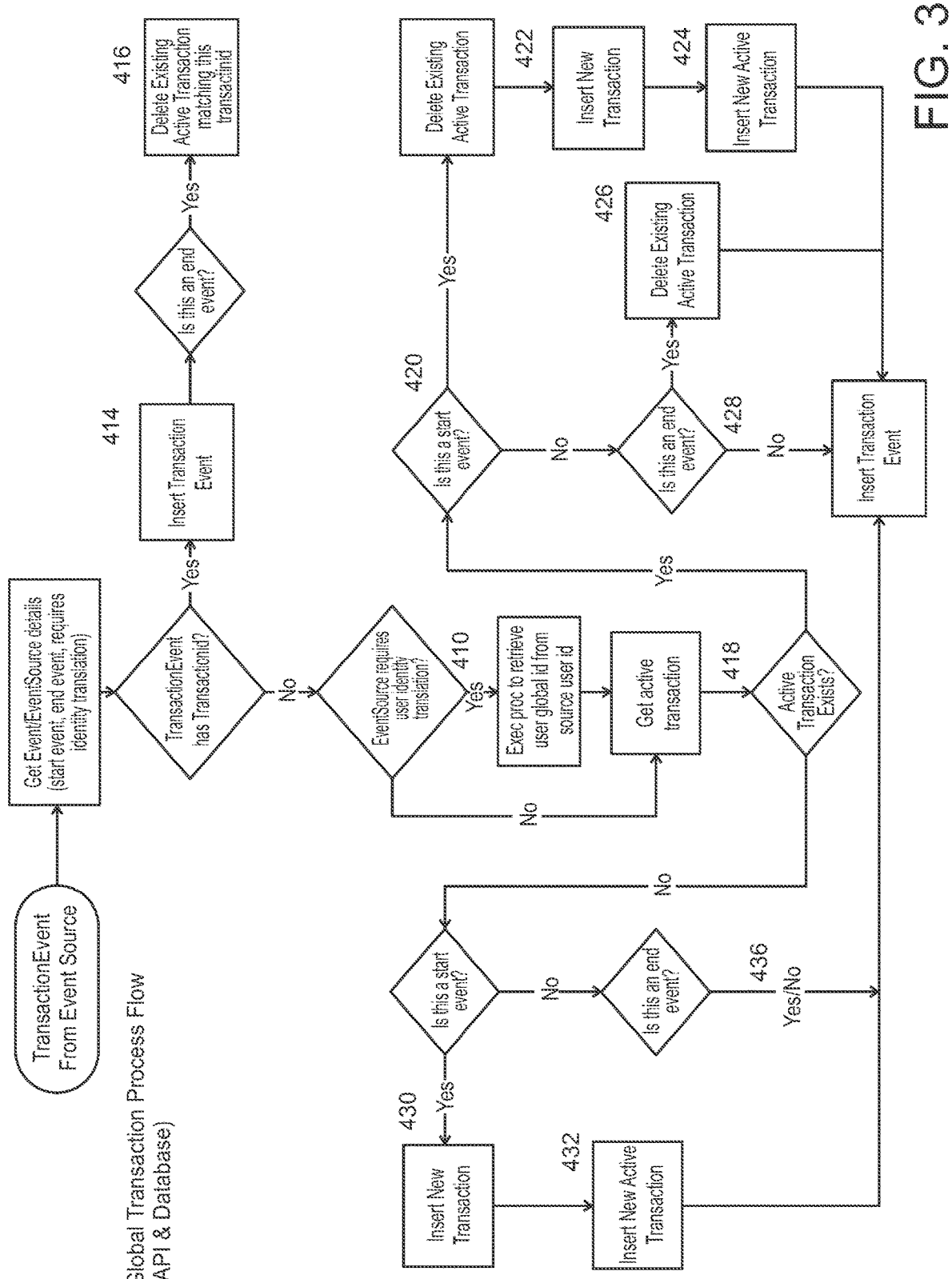

FIG. 4

Phone Transaction Timeline

| | Transaction Start Event | Chat Event | Chat Event | Search Event | Transaction Stop Event |
|---|---|---|---|---|---|
| Action | CTI Lite Call Answered | FirstCall one-on-one Chat Sent | FirstCall one-on-one Chat Received | NavLite Search | CTI Lite Call Disconnected |
| Description | CTI Lite Captures the answer event and communicates with Global Transaction API, to create new or subscribe to existing GTID | FirstCall message sent by Agent | FirstCall message sent another user and received by Agent in GTID | User Clicks Search | CTI Lite Captures the call disconnect event and communicates with Global Transaction API |
| Transaction Event Details | Event Type: Call Answered Source: CTI Lite Destination: Skill & Extension & UCID & Station ID | Event Type: Message Sent Source: FirstCall 1:1 Destination: User Source ID: FirstCall Chat ID | Event Type: Message Sent Source: FirstCall 1:1 Destination: User in GTID Source ID: FirstCall Chat ID | Event Type: Search Source: NavLite Search Query: Search Text Search Result: Result Count | Event Type: Call Disconnected Source: CTI Lite Destination: Skill & Extension & UCID & Station ID |
| Technical Process | Lookup User's Current Transaction ID, If User currently has Global Transaction, Associate Event to Existing Transaction | Associate Event to Existing Transaction GTID If Destination User is in GTID, associated Chat to both user's GTIDs | Associate Event to Existing Transaction GTID If Destination User is in GTID, associated Chat to both user's GTIDs | Associate Event to Existing Transaction GTID | Lookup User's Current Transaction ID, If User currently has Global Transaction, Associate Event to Existing Transaction |
| Output | GTID Event Record created in Global Transaction Database | GTID Event Record created in Global Transaction Database Associate to Parent GTID(s) | GTID Event Record created in Global Transaction Database Associate to Parent GTID(s) | GTID Event Record created in Global Transaction Database | GTID Event Record created in Global Transaction Database Close Open GTID for user |

FIG. 5

FOUNDATIONAL ANALYTICS ENABLING DIGITAL TRANSFORMATIONS

CROSS REFERENCE TO RELATED APPLICATION

This application claims priority from copending U.S. nonprovisional application Ser. No. 15/402,210 Jan. 9, 2017, the entirety of which is incorporated herein by reference, which itself claims priority to U.S. provisional Application No. 62/276,179 filed Jan. 7, 2016.

TECHNICAL FIELD AND BACKGROUND

The present invention relates generally to the field of electronic system monitoring, and more particularly, to systems and methods that enable the real-time monitoring and historical digitization of actions taken by various systems and software applications associated with a computing device and that enable the realization and creation of relationships between such actions. The resulting telemetry information may be used in downstream analytics and artificial intelligence systems and applications.

Existing systems and methods for electronic system monitoring do a poor job at capturing useful, cohesive data from disparate systems and software applications. Moreover, existing systems are not configured to create or ascertain relationships in the data captured during monitoring. As a result, existing monitoring systems cannot provide a complete and accurate picture of the various transactions performed by computing devices that could be used in downstream analytics to discern meaningful patterns in the captured data that could be used to improve performance or inform future decisions.

To illustrate, an existing monitoring system may be configured to periodically capture images of what is displayed on a computer monitor (i.e., a screen capture) or to retrieve log files from the computing device showing what websites have been visited. This captured data may take various formats, such as images or text, making analysis of the data difficult. Additionally, the captured data would not reveal with any certainty all of the software applications being utilized by the computing device or provide insight into what happened before and after the screen capture or website visit. And importantly, the monitoring system would not reveal any relationships in the captured data, such as whether the website visits were related to any documents displayed in the screen capture (e.g., was the end user performing research as part of generating the document?). Thus, the insights that can be gleaned from the captured data are limited.

It is, therefore, an object of the present invention to provide systems and methods that enable both the real-time monitoring and historical tracking of events and actions performed by disparate systems and software applications associated with a computing device that also permit insight into the relationships between such events and human actions within disparate applications. The inventive systems and methods synchronously and asynchronously captures event data from various event sources that can be hardware or software applications associated with a computing device. The event data can be enriched before correlating associated event data into transactions. The enriched, correlated data provides a more accurate and complete picture of what activities the computing device is performing and how the computing device is utilized to accomplish particular tasks. This in turn enables the system to perform analytical processes that provide valuable insights used to describe, predict, and improve end user and system performance.

SUMMARY OF THE INVENTION

In a first embodiment, the system provides a computer-implemented method of processing event data where a global transaction ingress API ("GTI API") receives an event data packet generated utilizing data from an event source software application running on an end point or agent computing device. The event data packet can include event data, such as (i) an endpoint identifier that identifies the agent computing device or the user of the agent computing device, (ii) an event source identifier that identifies the event source software application, and (iii) an event identifier that describes the particular event (e.g., performing a search. using the agent computing device or answering a call). The GTI API utilizes the event source identifier and the event identifier to determine whether the event data packet represents a start event, an end event, or an intermediate even. The GTI API then submits a transaction query to a memory cache that includes the endpoint identifier, and the memory cache returns a query response. The query response includes either (i) an existing global transaction identifier ("GTID") that is associated with the endpoint identifier, or (ii) a transaction indicator revealing that no existing GTID is associated with the endpoint identifier.

Following the memory cache query, the GTI API performs a transaction analysis that correlates the event data received from the agent computing device into transactions. In one exemplary transaction analysis, when the transaction indicator indicates that no existing GTID 15 associated with the endpoint identifier, the GTI API (i) creates a new GTID, (ii) correlates the new GTID with the event data packet, and (iii) submits the new GTID and the corresponding event data packet to an event queue for storage. Alternatively, when the endpoint identifier is associated with an existing GTID (i.e., a transaction is in progress), the GTI API correlates the existing GTID with the event data packet, and stores the GTID and corresponding event data packet to the event queue.

The event data packet can be generated by the source software application or by a secure talk desktop agent ("STDA") software application interfaced with the event source software application. The STDA can be useful when, for instance, the event source software application does not output data in a format that is easily incorporated into an event data packet for use by the GTI API. The event data packet can be transmitted directly to the GTI API from the agent computing device, or the event data packet can be first transmitted to a secure talk server that in turn transmits the event data packet to the GTI API.

In one embodiment, the event data packet is enriched by a user status API that appends various user status data elements to the event data packet. When the system is utilized in an office or business environment, for example, the user status elements can include various computing device, product, or business identifiers or location data for the agent computing device.

In yet another embodiment, following processing by the GTI API, the event data packet is transmitted to a presence API that performs a state analysis to generate state data. In an office or business environment, the state data can indicate, for instance, whether the agent computing device is in an On System or Off System state (i.e., whether the agent computing device is logged into a provider system), an On Call or Off Call state (i.e., whether the agent computing device end user is on the phone), or an On Chat or Off Chat state (i.e., whether the agent computing device end user is engaged in an instant messaging or "chat" session). To illustrate, when the state analysis determines that the event data packet represents an answer call event, the state data is set to an On Call state.

Following processing by the GTI API, the event data packet can be multiplexed or categorized according to the event source identifier before being utilized in various analyses, such as a descriptive analysis or predictive analysis performed by corresponding software applications. As one example, the multiplexed data packet is submitted to a descriptive analytics software application that performs a descriptive analytics analysis to determine client account activity data, such as the volume of calls received associated with a particular account or client. In another example, the multiplexed data packet is submitted to a predictive analytics software application that determines agent status data, such as the probability that the end user of an agent computing device will require assistance in performing a given task (i.e., fielding a call from a customer).

Other embodiments can optionally subject the event data packets to other processing operations following correlation into transactions by the GTI API. For instance, the event data packets can be tagged to append event category data that classifies the event data as belonging to a particular type of transaction, such as a sales call or customer support call. The event data packets can also be masked to remove sensitive data, such as social security or financial account numbers. Or the event data packets can be filtered to remove packets corresponding to particular filter criteria, such as removing event data packets corresponding to particular events occurring at the agent computing device.

BRIEF DESCRIPTION OF THE DRAWINGS

Features, aspects, and advantages of the present invention are better understood when the following detailed description of the invention is read with reference to the accompanying figures, in which:

FIG. 3 illustrates an exemplary process for correlating received event data into transactions.

FIG. 4 illustrates an exemplary transaction timeline comprising a series of events.

FIG. 5 illustrates an exemplary graphical user interface to display and utilize enriched, correlated event data.

DETAILED DESCRIPTION

Figure 1:
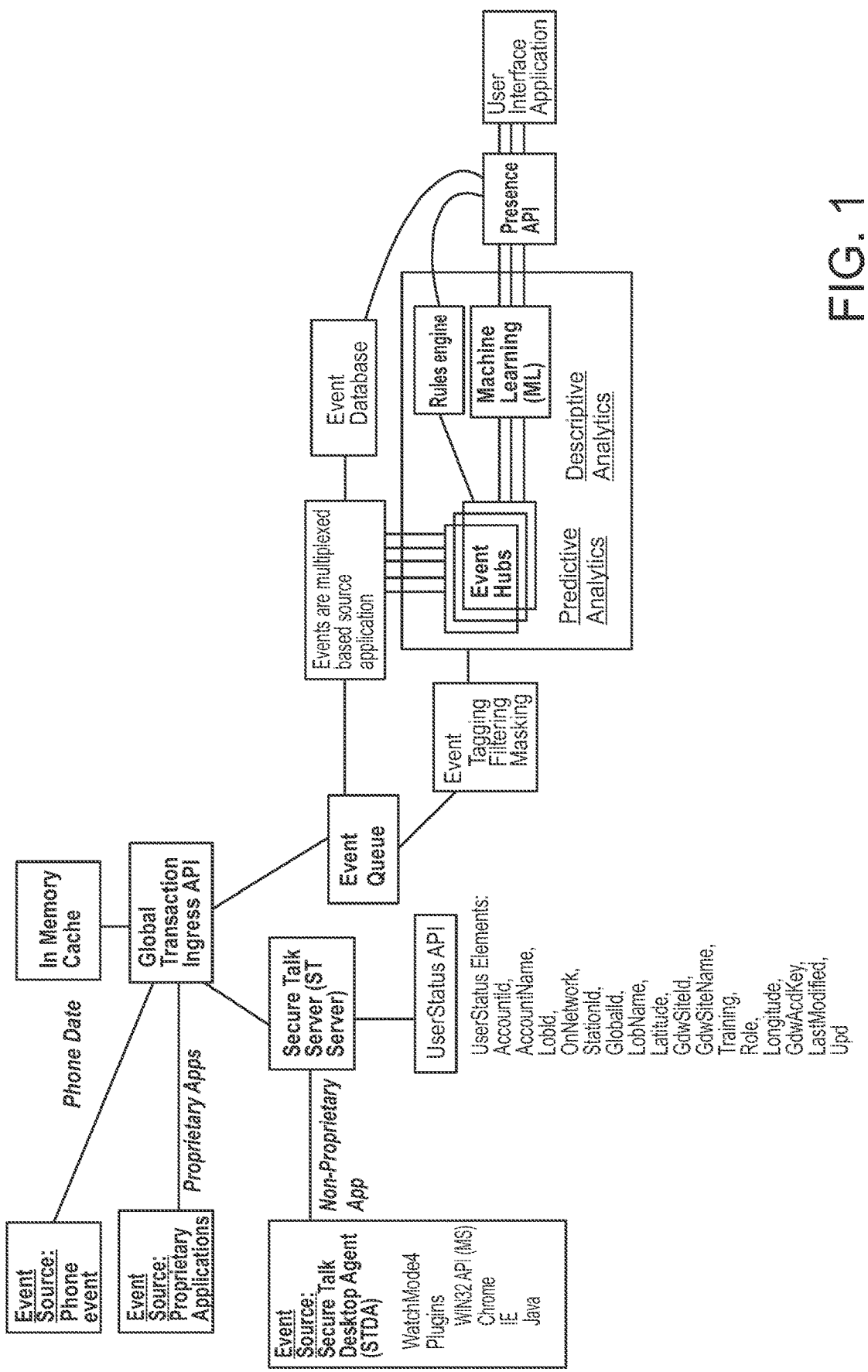
FIG. 1 is an exemplary system diagram according to one embodiment.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

Disclosed are systems and methods that enable the asynchronous capture and analysis of event data from a multitude of event sources associated with a computing device. The event data represents actions performed by an agent computing device. The event data is captured synchronously and asynchronously as events or actions occur. The event data is enriched and transmitted to a centralized location. Related events are correlated and associated into transactions that represent one or more activities or actions performed to accomplish a given task at the agent computing device. In this manner, the system not only enables real-time monitoring of individual actions performed by computing device but also provides insight into how a computing device is utilized to accomplish a given task or transaction over time. The exemplary embodiments discussed below are described with reference to the monitoring of end user computing devices utilized in a call center environment, but those of ordinary skill in the art will appreciate that the disclosed systems and methods are generally applicable to the centralized monitoring of computing devices.

As used herein, the term provider generally describes the person or entity providing customer support and service. The term "customer support" is used interchangeably with the terms support or customer service and generally includes, but is not limited to, providing customers with assistance in utilizing existing products and services and with purchasing additional products and services. The term "client" is used to generally denote a separate business entity from the service provider. Customers of the client are provided support by the service provider on behalf of the client; in other words, the provider is operating as a third-party provider of customer support services for the client. The term "agent" generally describes an individual who interfaces with the customer to provide customer support using the systems and methods described herein, and the term is used interchangeably with the terms end user, user, associate, or representative.

As shown in FIG. 1, an exemplary system configuration according to one embodiment includes: (i) multiple categories of event sources; (ii) a global transaction ingress application programmable interface ("GTI API") running on a first server; (iii) a Secure Talk application running on a second server ("ST Server"); (iv) a User Status application programmable interface ("API"); (v) a Memory Cache; (vi) an Event Queue; (vii) an Event Database; (vii) a Presence API; (viii) a User Interface Application; (ix) an Event Hub; (x) a Rules Engine; and (xi) a Machine Learning Engine. The system embodiment shown in FIG. 1 is not intended to be limiting, and one of ordinary skill in the art will recognize that the systems and methods of the present invention may be implemented using other suitable hardware or software configurations. For example, the system may utilize only a single server implemented by one or more physical or virtual computing devices, or a single computing device may implement one or more of the GTI API, the ST Server, or the event sources. Further, a single computing device may implement more than one step of the method described herein; a single step may be implemented by more than one computing device; or any other logical division of steps may be used.

The various system components are generally implemented by software applications running on one or more physical or virtual computing devices (e.g., a virtual desktop application). To illustrate, in one embodiment, the various event sources are implemented by software applications that run on a physical agent computing device in communication with the GTI API running on a separate server computing device. Alternatively, the event sources can be implemented as software applications running on a virtual computing device that is in turn running on the same physical computing device as the GTI API. The computing devices may also utilize software applications that function using resources available through a third-party provider, such as a Software as a Service ("SasS"), Platform as a Service ("PaaS"), or Infrastructure as a Service ("IaaS") provider running on a third-party cloud service computing device. For example, a cloud computing device may function as a resource provider by providing remote data storage capabilities that implement the Event Database or Event Hubs shown in FIG. 1.

The event sources communicate with the GTI API either directly or through the ST Server. The system can accommodate multiple types of event sources in various configurations. As an example, the phone event source shown in FIG. 1 can be implemented as a separate hardware telephone device connected to computer telephony interface ("CTI") system or as a virtual telephony interface ("VTI") that runs as a software application on a physical or virtual end user computing device. Multiple software applications serving as event sources can run on a single agent computing device. The system will generally include a plurality of agent computing devices where each agent computing device implements multiple event sources.

The event sources capture event data that represents various activities occurring at the agent computing device as well as other useful information. The system can utilize any suitable number and type of event sources that are configured to capture event data and transmit the event data to the GTI API either directly or through the ST Server in an event data packet format. The event data can be transmitted using JavaScript Object Notation ("JSON") or any other suitable format. The event data packets are transmitted to the GTI API asynchronously as each event occurs to ensure real-time capture of relevant event data as opposed to sending the event data in event data packets at periodic or predetermined intervals.

The available data fields and content for the event data packets is customizable and will generally vary depending on, among other things, the event source application. Exemplary event data fields include, but are not limited to: (i) time and date data; (ii) an event identifier that can be used to determine the activity represented by the event data; (iii) an event type representing the category of activities represented by the event; (iv) one or more indicator flags indicating whether the event is a start event, end event, or neither; (v) an endpoint identifier such as an event source identifier that identifies the software application originating corresponding event data; (vi) an endpoint identifier such as an event source user identifier User Principle Name ("UPN") used by the event source to identify the current end user of the event source application or the agent computing device, which can be, for instance, a username, employee number, or other identifier entered by the end user when logging into the agent computing device or into the software application that serves as the event source; (vii) a global user identifier ("GUID") that identifies the end user of the agent computing device and that is independent of the software applications or computing devices being utilized; (viii) a source record identifier that identifies a unique record in the event source application and that can be utilized by the Predictive Analytics or other application to lookup additional information in the source application's database about the event; (ix) a global transaction identifier ("GTID") discussed in more detail below; (x) a client account identifier and a line of business identifier that can be used by a service provider to identify a client or industry being served by the activities of end user and agent computing device; and (xi) any information available from the event source that is useful for real-time monitoring or analytics.

As shown in FIG. 1, the phone event data is captured and transmitted directly to the GTI API in real time. The phone event source can capture event data such as, a start call event, an end call event, or an on-hold event indicating that an ongoing telephone call has been placed on or taken off hold.

The system can also include various proprietary and non-proprietary software applications running on the agent computing devices. Non-proprietary or commercial software applications running on the agent computing devices can include, for instance, the computing device operating system software (e.g., Microsoft Windows®), Java® virtual machine, or Internet browser applications (e.g., Google Chrome® or Internet Explorer®). The proprietary and non-proprietary software applications capture event data such as text entered in a graphical user interface ("GUI"), the selection of an input function that initiates a keyword search in an Internet browser, or sending a communication through an instant "chat message" software application.

Proprietary software applications can be designed and preconfigured to asynchronously capture event data in real time for transmission directly to the GTI API. Non-proprietary applications, however, might not be configured to permit the asynchronous capture and transmission of event data. The system shown in FIG. 1 illustrates the use of a Secure Talk Desktop Agent ("STDA") software application running on the agent computing device to interface with various non-proprietary applications (e.g., the Win32 API for Windows®) to enable the capture and transmission of event data. The STDA application may establish a protocol for reading the particular output of the non-proprietary software application and translating the output into a JSON packet for transmission to the GTI API. Alternatively, where a protocol for reading the output of a non-proprietary software application cannot be established, the STDA may utilize techniques such as "screen scraping" that captures human-readable outputs from the non-proprietary application intended for display on a monitor.

The STDA or other event sources may transmit the captured event data to the GTI API directly or through the ST Server, as illustrated in FIG. 1. Transmission of event data through the ST Server or another intermediary device distributes the required processing of event data over multiple network layers and devices. This has a particular advantage for networks with a large number of agent computing devices or a large number of event sources as the GTI API might not be capable of processing event data transmitted in real time from hundreds or even thousands of event sources. Event data processing functions, such as data enrichment, can be performed in whole or in part by the intermediary ST Server or another computing device running a User Status API. Other embodiments may utilize multiple GTI APIs to handle incoming event data.

The event data is enriched by appending one or more user status elements to the event data. The ST Server queries the User Status API using the UPN, and the User Status API returns information relating to the end user that is then appended to the event data as user status elements before transmission to the GTI API. In some embodiments, the GTI API can perform the data enrichment function. Or alternatively, the data enrichment can be performed by the event source software application itself prior to transmission to the GTI API or the ST Server, as illustrated in FIG. 1 where the proprietary applications event source is preconfigured to generate site, account program, and line of business ("SAPL") data that is sent with the event source data to the GTI API. The generated SAPL data can also be utilized to properly direct transmission of the event data to a particular GTI API in embodiments where multiple GTI APIs are utilized. So, for example, all event data coming from particular provider sites can be directed to a dedicated GTI API for those sites.

In the context of a call center where the end users are provider agents fielding consumer calls regarding various products or services provided by various clients, the user status element data can include: (i) a client account name and identification number for the client; (ii) a line of business identifier for the call service provider (i.e., a given industry or category of products); (iii) an agent computing device identifier; (iv) an agent role designation (i.e., junior agent, senior agent, supervisor, etc.); (v) geographic location data for the provider agent; (vi) a site identifier if the provider agent is working from a given provider location or office; (vii) an "on-network" flag indicating whether the provider agent is working remotely or from within a provider location; or (viii) or any other information useful to the provider. In this manner, the event data is enriched so as to provide insight beyond just what activities occurred at the agent computing device. So, for instance, a provider could then determine whether agents at a particular location or working for a particular client answer more calls (i.e., more start call events) or spend more time per call (i.e., time between start call event and end call event) than agents at other locations or agents working for other clients.

Figure 2:
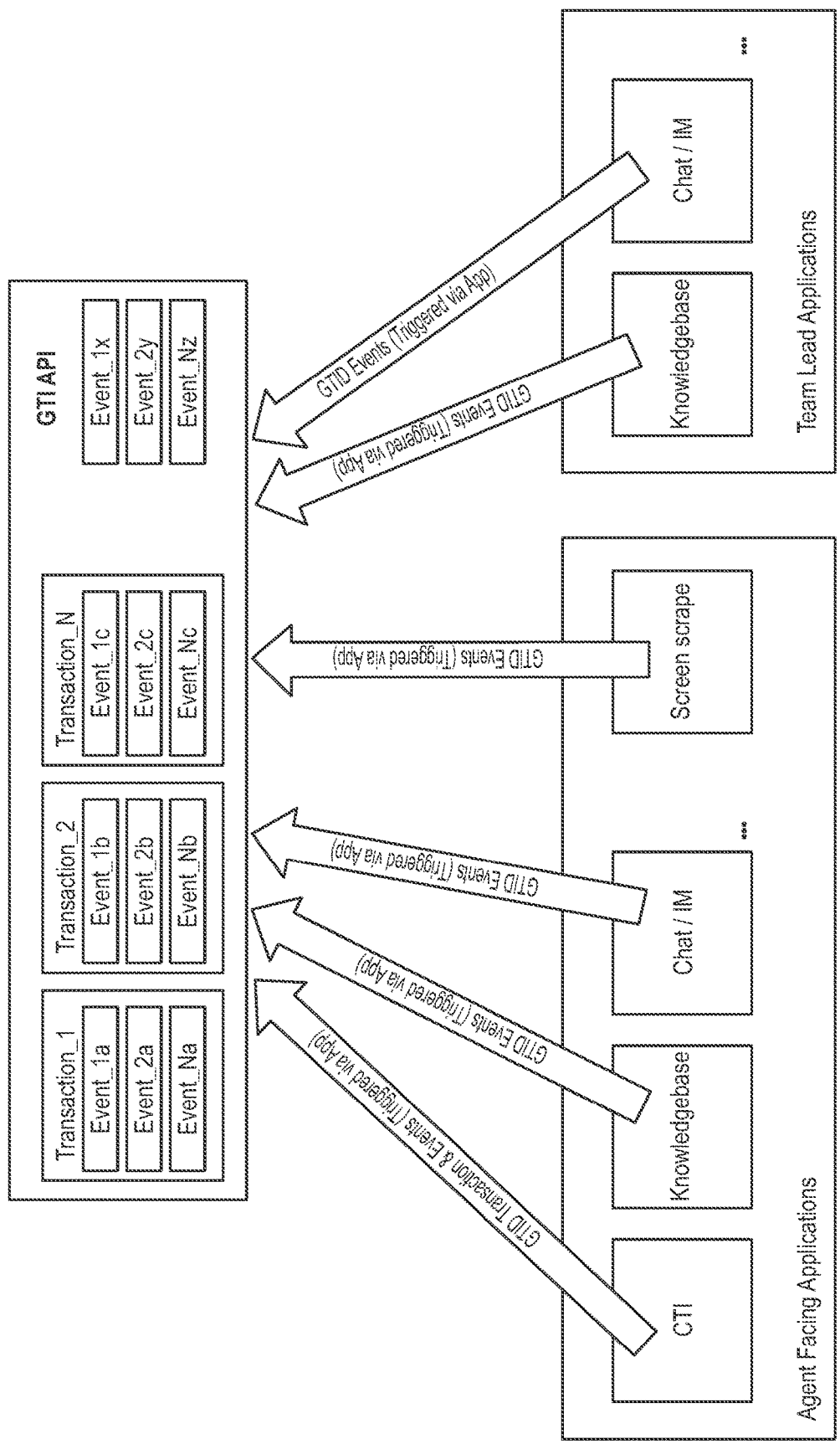
FIG. 2 depicts discrete transactions comprising event data from multiple sources.

Following enrichment and receipt of event data, the GTI API performs a transaction analysis that correlates the event data into transactions that represent a series of related activities performed by the agent computing device to accomplish a particular task. The correlation of event data into transactions is depicted in FIG. 2 where various event source software applications (e.g., CTI, Knowledgebase, Chat/Instant Message) transmit event data, or "GTID Transaction & Events," to the GTI API. The GTI API then correlates the events into separately identified transactions (i.e., Transaction_1, Transaction_2, . . . Transaction_N).

FIG. 3 illustrates an exemplary GTI API process flow for a transaction analysis that correlates event data into transactions. The event data can be correlated into transactions by, for example, associating a transaction identifier with the event data by appending the transaction identifier to the event data or associating the event data with a particular transaction identifier in a relational database. To facilitate the correlation, certain events can be designated by the event sources as start events or end events signaling the beginning or end of a transaction. In a call center, for example, many transactions will focus on the receipt and handling of customer phone calls. Thus, answering the phone can be designated as a start event and hanging up the phone can be designated as an end event. On receiving event data from an event source, the GTI API determines both the UPN and whether the event data represents a start event or end event. The event can also be designated as an intermediate event within the transaction, or the lack of a start event or end event designation can be interpreted as the event data representing an intermediate event.

The GTI API utilizes the UPN to query the Memory Cache, which can be implemented as a database that includes a table of open global transaction identifiers ("GTID") and the associated UPN. This permits the GTI API to determine whether there is an open transaction for received event data. In some systems, the various event sources may utilize different event data fields and formats. To accommodate disparate event data formats, the GTI API may be required to translate 410 the UPN. So, for instance, a phone event source may utilize the end user's extension as the UPN. The GTI API performs a translation 410 by querying a separate database using the phone extension and in turn receives a UPN that can be used by the GTI API to query the Memory Cache.

Turning again to FIG. 3, if the event data received by the GTI API already includes a GTID 412, then an open transaction exists. The GTI API "inserts" 414 the event data into the open transaction by associating the open GTID with the received event data. If the received event data represents an end event, the GTI API deletes 416 the GTID from the Memory Cache. Once the GTID is deleted, the next time that the GTI API receives event data with that particular UPN, then Memory Cache will return a query response with a transaction indicating having a value of "null" indicating that no GTID and no open transaction exists for that agent computing device or UPN.

When the received event data does not include an open GTID, the event data UPN is translated 410, as necessary, and the GTI API queries 418 the Memory Cache to determine whether an open GTID exists. If the Memory Cache returns an open GTID but the event data represents a start event 420, the GTI API will delete the current open GTID from the Memory Cache and create a new open GTID that is associated 422 with the received event data. The new open GTID is stored to the Memory Cache 424, and the event data and associated GTID are stored to the Event Que. In this manner, the system ensures that each end user or agent computing device is associated with at most one open transaction at all times as the receipt of a start event while an open GTID exists could indicate that the GTI API did not properly receive or process a previous end event.

When the Memory Cache query returns an open GTID and the event data represents an end event, the GTI API will delete 426 the open GTID from the Memory Cache and store the event data to the Event Queue. Otherwise when the Memory Cache query returns an open GTID and the event data does not represent a start or end event, the transaction remains open and the GTID remains stored to the Memory Cache while the event data is associated with the open GTID and the event data and associated GTID are stored 428 to the Event Queue.

When the Memory Cache query does not return an open GTID (i.e., there is no record of an open transaction for that end user) and the event data represents a start event, the GTI API opens 430 a new transaction by creating a new open GTID and storing the new GTID to the Memory Cache 432. The event data is "inserted" into the transaction by associating the new GTID with the event data. The event data and associated GTID are stored to the Event Queue. Otherwise, when the Memory Cache query does not return an open GTID and the event data does not represent a start event, the GTI API creates a new GTID and stores the event data and associated GTID to the Event Queue without storing the GTID to the Memory Cache 432. Thus, the event data is treated as the only event comprising that transaction and subsequent event data associated with that UPN will be treated as a new transaction.

FIG. 4 illustrates an exemplary transaction occurring at a call center that begins with a call answer event using a CTI phone event source referred to as "CTI Lite." The call answer event is designated as a start event and transmitted to the GTI API where it is associated with an existing open transaction (if one exists) corresponding to the end user's identifier/UPN. The call answer event is followed first by a send chat event and then by a receive chat event using an instant messaging chat application referred to as "FirstCall." The send and receive chat events are transmitted to the GTI API, and the user identifiers (UPN) for both the message sender and the message recipients can be used to query the Memory Cache for the existing open GTID and associated with the corresponding GTID. Next, the chat events are followed by an information search event using a software application event source referred to as "NavLite." The search event data is sent to the GTI API and associated with the corresponding open GTID. Lastly, the call center agent ends the call prompting the CTI Lite event source to generate an end call event that is transmitted to the GTI API and associated with the corresponding GTID.

The start call, send chat, receive chat, search, and end call events shown in FIG. 4 are all associated with the same GTID and the same end user UPN such that the events can be analyzed together as part of a single transaction. This permits the system to determine a call duration, the number of chat messages, the number of searches, as well as other information relating to the call, thereby providing useful information at the transactional rather than single event level. This also permits an analysis of a given end user's actions across multiple transactions, thereby providing useful insight into end user status and performance, as discussed in more detail below.

Turning again to FIG. 1, incoming event data to the GTI API is stored to the Event Queue as an individual event associated with a GTID. The event data is optionally subjected to additional processing while stored to the Event Queue, such tagging, filtering, or masking. Event data tagging refers to the process of categorizing various events according to predetermined and customizable preferences, such as determining whether a particular event occurred as part of a sales call or customer support call, and appending an additional data field to the event data that identifies the event data category. The event data masking process scrubs the event data to remove certain information according to predetermined and customizable preferences, such as removing social security numbers, financial account numbers, or other sensitive data. The event data can also be filtered to delete particular events according to predetermined and customizable preferences.

Event data stored to the Event Queue is multiplexed to group the event data according to the event source application before being stored to the Event Database for longer term storage or passed to a Predictive Analytics, Descriptive Analytics, or Insight Analytics Workspace ("IAWS") software application. For instance, the event data multiplexing may identify all event data generated by a given Internet browser or by a phone event source. The system stores the multiplexed event data to an Event Hub, or queue, before passing the multiplexed event data to a Rules Engine or Machine Learning process for further analysis to provide customizable insights into the current or past activities of the agent computing device(s).

The Descriptive Analytics software application utilizes models that quantify and provide insight into a provider's operation, including, for instance, information relevant to a particular provider client account, site location, or line of business. The Descriptive Analytics application provides a short-hand mechanism to gain an understanding into the overall volume, quantity, boundaries, or shape of client account activities or a line of business, which can serve as one of the initial stages for more advanced analytics. Mean, mode, dispersion, distribution, central tendency, outliers, and timelines are some examples of the measurements and techniques that can be applied by the Descriptive Analytics application. As an example, the Descriptive Analytics application can provide data relevant determining appropriate staffing levels for agents during a given shift or for a given line of business or data relevant to analyzing agent proficiency.

The Predictive Analytics application utilizes a wide range of models to describe the magnitude and direction of factors that influence a business's activities and are used to forecast future outcomes. The Predictive Analytics application analyzes historical data using a wide variety of techniques, including, for example, simple linear modeling and machine learning neural network analysis to generate optimal predictive outcome. Rigorous consistency and historical back-testing establish a confidence level with the predictions so they can be relied on for decision making. As a simplified example, the Predictive Analytics may determine that an agent computing device has been engaged in a call of a prolonged duration or that the agent computing device has performed an unusually large number of Internet searches during an ongoing call, which can be an indication that the ongoing call is not going well and the agent needs assistance or additional training.

The system may additionally utilize an IAWS application that comprises an integrated suite of tools and visualizations that bring together telemetry event data and recordings of customer interactions with agents. The IAWS application is designed to facilitate and automate data exploration, observation, and digital analysis by disaggregating phone or instant messaging data into segments. The IAWS can automatically detect process steps in telemetry event data streams in part by applying labels to sequences of events that include user-friendly English names. For instance, event data and call recording data can be analyzed to identify certain phases of an agent call with a customer, such as an initial intake phase to gather information, trouble-shooting phases, etc.). The IAWS application can also be utilized to generate process graphs from thousands of interactions and derive insights and opportunities for actions in part by identifying anomalies and outliers.

Following storage to the Event Database or processing by the Predictive Analytics, Descriptive Analytics, and/or the IAWS software applications, the event data is optionally sent to a Presence API for further processing that results in agent computing device state data. In the exemplary embodiments described herein, the Presence API analyzes the event data to ascertain certain state data that includes (i) whether the agent computing device is or was logged into the provider system ("On System" or "Off System"), (ii) whether the end user of the agent computing device is or was engaged in a call ("On Call" or "Off Call"), and (iii) whether the end user of the agent computing device is or was engaged in an instant messaging chat session with a consumer ("On Chat"

or "Off Chat"). A supplementary Presence API can optionally be utilized to ascertain additional information, such as the number of instant messaging chat sessions the agent user computing device is or was engaged in, if any. As discussed in more detail below, the state data generated by the Presence API can be utilized by a graphical user interface application to indicate to a user the state of a particular agent or agent computing device.

The Presence API utilizes event data from the phone event source alone or in combination with other event sources to ascertain whether an agent computing device is in an On Call or Off Call state. Receipt by the Presence API of a start call event indicates an On Call state, and receipt by the Presence API of an end call event indicates an Off Call state. The Presence API can optionally utilize data from another event source, such as an After Call Wrap-up ("ACW") application to determine whether an agent computing device is in an Off Call state. To illustrate, in some embodiments, an agent may be required to perform additional processing following the end of a call, such as data entry related to the call. In that case, it may be advantageous for the agent to remain in an On Call state to ensure that another call is not received while processing the additional data. The agent computing device can utilize an ACW application or event source that transmits an ACW event to the GTI API and eventually to the Presence API. The Presence API will not transition the agent computing device to indicate an Off Call state until both an end call event is received from the phone event source and an end event is received from the ACW application. Thus, the Presence API can be configured to analyze data from multiple event sources to ascertain state data for an agent computing device.

The Presence API can detect a login or logoff event transmitted by an event source software application utilized to authenticate the agent computing device to a provider system, thereby transitioning the state data to an On System or Off System state. In other embodiments, the Presence API may utilize data from a proprietary application to determine whether an agent computing device has logged into a provider system, thereby entering an On System state. To illustrate, a provider's system can be configured so that a proprietary browser application launches each time an agent computing device logs into the provider system. Receipt by the GTI API and the Presence API of start browser event data from the browser application results in the Presence API generating state data indicating that the agent computing device is in an On System state. Likewise, receipt by the Presence API of end browser event data results in the Presence API generating state data indicating that the agent computing device is in an Off System state. The Presence API similarly can determine whether an agent computing device is in an On Chat or Off Chat state resulting in the generation of corresponding state data through analysis of event data received from an instant messaging chat application. That is, receipt of start messenger event data results in the Presence API generating On Chat state data, and receipt of end messenger event data results in the Presence API generating Off Chat state data.

The Presence API can be configured to analyze data from multiple event sources using the Rules Engine shown in FIG. 1 that may be configured to provide, for example, the exemplary rule above that the agent computing device is not transitioned to an Off Call state until an end event is received from both the phone event source and the ACW event source. The Rules Engine may provide the Presence API with multiple rules for ascertaining the state of the agent computing device. As an example, the Presence API may transition the agent computing device to an Off Call or Off Chat state when the device has been in an On Call or On Chat state for four hours or another predetermined amount of time given that it is unlikely a call or chat session would persist for such a long duration. In other embodiments, the Presence API can automatically generate state data indicating that the agent computing device is in an Off Call or Off Chat state when the agent computing device is transitioned from the Off System to the On System as it is unlikely that the agent computing device would have been engaged in a call or chat session while the device was not logged into the system. Those of ordinary skill in the art will appreciate that the above examples are not intended to be limiting and other rules and states are possible.

Processing by the Presence API can be useful, for instance, where analysis of the multiplexed data does not provide complete information about the state of the agent computing device. To illustrate, an instant messaging chat application may function as part of an Internet browser application so that instant messaging events are not separately multiplexed or identified from other event data originating from an Internet browser event source. The Presence API in that case can be useful to separately identify and analyze instant messaging event data from incoming Internet browser event data.

Figure 5:
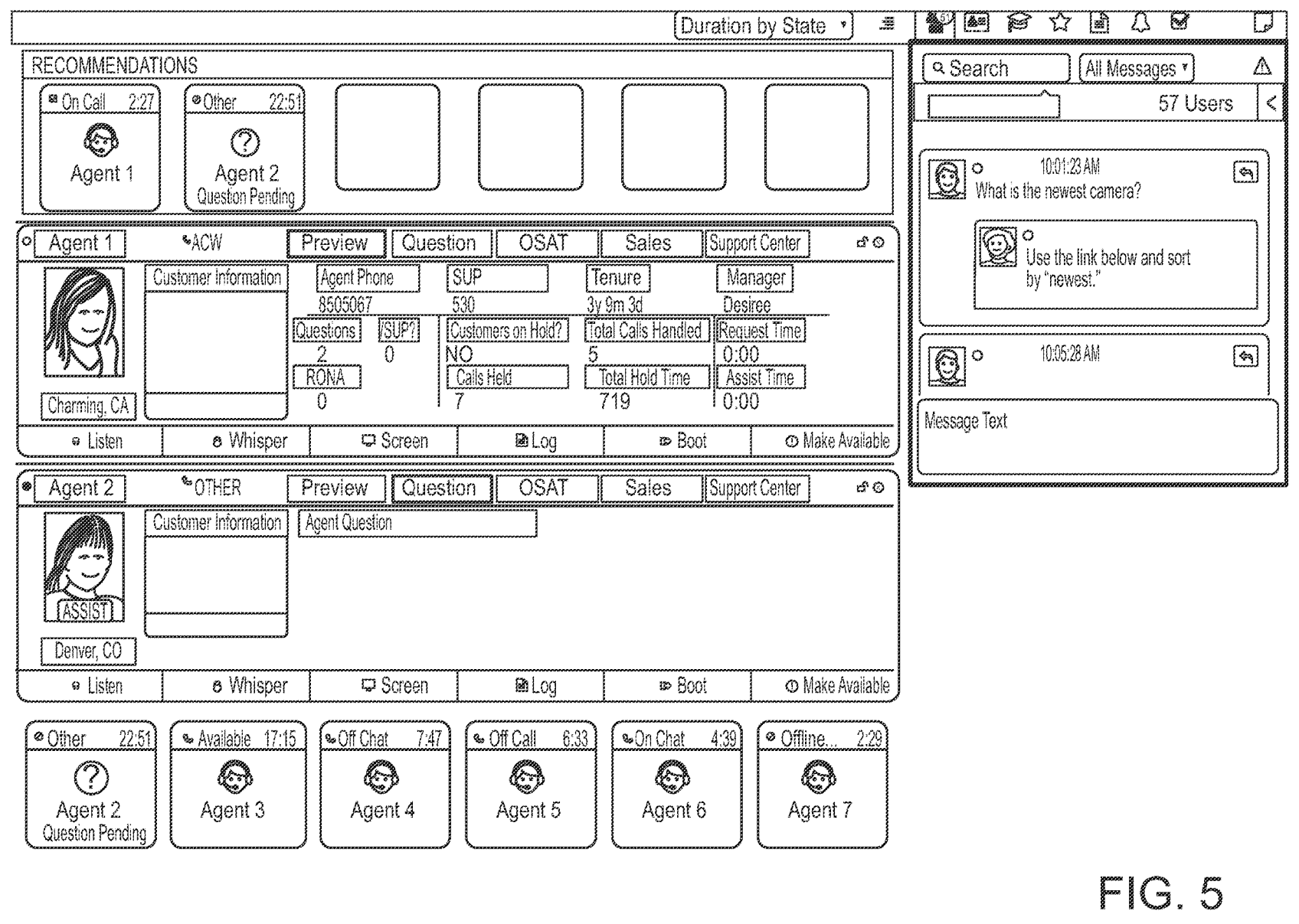

Following processing by the Presence API, the event data is optionally passed to a user interface application to enable monitoring of the agent computing devices in real time or to permit further analyses of event data that can inform future decisions and actions. The Adaptive Workspace shown in FIG. 5 illustrates an exemplary graphical user interface ("GUI") screen or dashboard for real-time monitoring that is generated using the enriched, correlated event data. Other embodiments may utilize various Adaptive Workspace GUI designs customized for utilization by end users of the agent computing devices that may not require the monitoring capabilities illustrated in the Adaptive Workspace GUI of FIG. 5. The various Adaptive Workspace GUIs are created using a User Experience Design Methodology ("UX") that focuses on the needs of end users while still achieving desired provider objectives. The workspace GUIs are adaptive in that they provide end users with information and tools necessary to complete a given task before transforming the GUI once the task is completed to allow the end user to continue with the next task.

Turning again to FIG. 5, the exemplary Adaptive Workspace dashboard illustrates the use and display of enriched, correlated event data in the context of a call center environment. End users and agent computing devices are depicted using square icons or end user "tiles." The dashboard can be configured to display a variety of information relating to the end users and agent computing devices. The dashboard is configured to display background and employment information relating to the agents that can be extracted from the user status elements of the enriched event data, including, but not limited to: (i) the identity of the agent's manager; (ii) the agent's site or geographic location; (iii) the agent's role; (iv) the agent's experience or tenure; or (v) any other information useful for monitoring and managing the performance of the agents. The exemplary embodiment of FIG. 5, for example, shows that Agent 1 is located in Charming Calif., has a supervisor named "Desiree," and has a tenure experience of over three years and nine months.

The event data also permits the display of information relating to the agent's performance, including, but not limited to: (i) the amount of time an agent has spent on calls during a shift (as measured based on the time between receipt by the GTI API of call start and call end events from the phone event source); (ii) the number of calls answered by an agent during a shift (as measured by the number of start call events received by the GTI API from the phone event source); (iii) the number of times during a shift that the agent placed a call on hold (as measured by the number of hold call events received from the phone event source); (iv) the total amount of time an agent placed a call on hold (as measured by the time between hold events received from the phone event source); (v) the number of questions asked by an agent during a shift using an instant messaging chat application; or (vi) any other information useful for monitoring and managing the performance of the agents. The exemplary embodiment of FIG. 5, for example, shows that Agent 1 has handled five calls during the current shift and placed a call on hold seven times for a total of 719 seconds. This information can be analyzed on an individual agent basis or as aggregated data across all agents to provide useful insights and to guide future decisions, such as whether an individual agent requires more training or whether call volumes as a whole warrant more or less agents scheduled to be available for a given shift for a given client, location, or provider line of business.

In addition to performance information, because the system receives event data asynchronously in real time, the system can also determine and display: (i) current state information received from the Presence API; (ii) status information, such as whether an agent requires assistance (i.e., the Predictive Analytics application determines that a call has persisted too long, the agent has asked too many questions, etc.); or (iii) any other information useful for monitoring and managing the performance of the agents. The exemplary embodiment of FIG. 5, for example, shows that: (i) Agent 1 is currently in an On Call state that has lasted for two minutes and twenty-seven seconds; (ii) Agent 2 has a pending question and is currently in an On Call state that has lasted for over twenty minutes, and as a result, requires assistance; (iii) Agent 3 is available; (iv) Agent 4 is in an Off Chat state; (v) Agent 5 is in an Off Call state; (vi) Agent 6 is in an On Chat state; and (vii) Agent 7 is currently offline in an Off System state.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method of processing event and telemetry data comprising the operations of:
   (a) receiving by a global transaction ingress API (GTI API), at least one event data packet, wherein the at least one event data packet is generated utilizing data from an event source software application running on an agent computing device, and the event data packet comprises (i) an endpoint identifier that identifies the agent computing device or the user of the agent computing device, (ii) an event source identifier that identifies the event source software application, and (iii) an event identifier;
   (b) determining by the GTI API based on the event source identifier and the event identifier whether the event data packet represents a start event, an end event, or an intermediate event;
   (c) submitting by the GTI API, a transaction query to a memory cache, wherein the transaction query comprises the endpoint identifier, and the memory cache returns a query response comprising (i) an existing global transaction identifier (GTID) associated with the endpoint identifier, or (ii) a transaction indicator that no existing GTID is associated with the endpoint identifier;
   (d) performing by the GTI API, a transaction analysis wherein:
      (i) when the transaction indicator indicates that no existing GTID is associated with the endpoint identifier, the GTI API performs the operations of (A) creating a new GTID, (B) correlating the new GTID with the at least one event data packet, and (C) submitting the new GTID and the correlated at least one event data packet to an event queue for storage;
      (ii) when the endpoint identifier is associated with the existing GTID, the GTI API performs the operations of (A) correlating the existing GTID with the at least one event data packet, and (B) submitting the existing GTID and the correlated at least one event data packet to the event queue for storage.

2. The computer-implemented method of claim 1, wherein the at least one event data packet is generated by the event source software application.

3. The computer-implemented method of claim 1, wherein the agent computing device further comprises a secure desktop agent software application interfaced with the event source software application, and the method further comprises the operations of:
   (a) generating by the secure talk desktop agent software application, the at least one event data packet;
   (b) transmitting by the agent computing device, the at least one event data packet to a secure talk server;
   (c) enriching by a user status API, the event data packet by appending one or more user status elements; and
   (d) transmitting by the secure talk server, the event data packet to the GTI API.

4. The computer-implemented method of claim 1 further comprising the operation of enriching by a user status API, the event data packet by appending one or more user status elements.

5. The computer-implemented method of claim 4, wherein the one or more user status elements comprise a client account identifier and location data for the agent computing device.

6. The computer-implemented method of claim 1 further comprising the operations of:
   (a) receiving by a presence API, the at least one event data packet;
   (b) performing by the presence API, a state analysis utilizing the event source identifier and the event identifier to generate state data.

7. The computer-implemented method of claim 6, wherein when the state analysis determines that the at least one event data packet represents a start call event, the state data is set to an On Call state.

8. The computer-implemented method of claim 6, wherein when the state analysis determines that the at least one event data packet represents an end event, the state data is set to an Off Call state.

9. The computer-implemented method of claim 6, wherein:
   (a) when the state analysis determines that the at least one event data packet represents a system login event, the state data is set to an On System state; and
   (b) when the state analysis determines that the at least one event data packet represents a system logoff event, the state data is set to an Off System state.

10. The computer-implemented method of claim 1, wherein following storage of the at least one event data packet and correlated GTID to the event queue, the method further comprises the operations of:
 (a) multiplexing the at least one event data packet according to the event source identifier;
 (b) receiving by a descriptive analytics software application, the multiplexed at least one data packet; and
 (c) performing by the descriptive analytics software application, a descriptive analytics analysis to determine client account activity data.

11. The computer-implemented method of claim 10, wherein the client account activity data comprises client account call volume data.

12. The computer-implemented method of claim 1, wherein following storage of the at least one event data packet and correlated GTID to the event queue, the method further comprises the operations of:
 (a) multiplexing the at least one event data packet according to the event source identifier;
 (b) receiving, by a predictive analytics software application, the multiplexed at least one data packet; and
 (c) performing by the predictive analytics software application, a predictive analysis that determines agent status data.

13. The computer-implemented method of claim 12, wherein the agent status data comprises a probability that an end user of the agent computing device requires assistance.

14. The computer-implemented method of claim 1, wherein following storage of the at least one event data packet and correlated GTID to the event queue, the method further comprises the operation of tagging the at least one event data packet to append event category data.

15. The computer-implemented method of claim 1, wherein following storage of the at least one event data packet and correlated GTID to the event queue, the method further comprises the operation of masking the at least one event data packet to remove sensitive data.

16. The computer-implemented method of claim 1, wherein following storage of the at least one event data packet and correlated GTID to the event queue, the method further comprises the operation of filtering the at least one event data packet to delete the event data packet if the event data identifier meets predetermined filter criteria.

17. A computer-implemented method of processing event and telemetry data comprising the steps of:
 (a) receiving by a global transaction ingress API (GTI API), at least one event data packet, wherein the at least one event data packet is generated utilizing data from an event source software application running on an agent computing device, and the event data packet comprises (i) an endpoint identifier that identifies the agent computing device or the user of the agent computing device, (ii) an event source identifier that identifies the event source software application, and (iii) an event identifier;
 (b) determining by the GTI API based on the event source identifier and the event identifier whether the event data packet represents a start event, an end event, or an intermediate event;
 (c) submitting by the GTI API, a transaction query to a memory cache, wherein the transaction query comprises the endpoint identifier, and the memory cache returns a query response comprising (i) an existing global transaction identifier (GTID) associated with the endpoint identifier, or (ii) a transaction indicator that no existing GTID is associated with the endpoint identifier;
 (d) performing by the GTI API, a transaction analysis wherein:
  (i) if the at least one event data packet represents a start event and the transaction indicator indicates that no existing GTID is associated with the endpoint identifier, the GTI API performs the operations of (A) creating a new GTID, (B) associating the new GTID with the endpoint identifier and with the at least one event data packet, (C) submitting the new GTID and the endpoint identifier to the memory cache for storage, and (D) submitting the new GTID and the at least one event data packet to an event queue for storage;
  (ii) if the at least one event data packet represents an end event or an intermediate event and the transaction indicator indicates that no existing GTID is associated with the endpoint identifier, the GTI API performs the operations of (A) creating a new GTID, (B) associating the new GTID with the at least one event data packet, and (C) submitting the new GTID and the at least one event data packet to the event queue for storage;
  (iii) if the at least one event data packet represents a start event and the endpoint identifier is associated with the existing GTID, the GTI API performs the operations of (A) initiating a deletion of the existing GTID from the memory cache, (B) creating a new GTID, (C) associating the new GTID with the endpoint identifier and with the at least one event data packet, (D) submitting the new GTID and the endpoint identifier to the memory cache for storage, and (E) submitting the new GTID and the at least one event data packet to the event queue for storage;
  (iv) if the at least one event data packet represents an end event and the endpoint identifier is associated with the existing GTID, the GTI API performs the operations of (A) initiating a deletion of the existing GTID from the memory cache, (B) associating the existing GTID with the at least one event data packet, and (C) submitting the existing GTID and the at least one event data packet to the event queue for storage; and
  (v) if the at least one event data packet represents an intermediate event and the endpoint identifier is associated with the existing GTID, the GTI API performs the operations of (A) associating the existing GTID with the at least one event data packet, and (B) submitting the existing GTID and the at least one event data packet to the event queue for storage.

* * * * *